United States Patent
Borg et al.

(10) Patent No.: US 6,208,351 B1
(45) Date of Patent: *Mar. 27, 2001

(54) CONVERSION OF ALPHA-MULTIPLIED COLOR DATA

(75) Inventors: Lars U. Borg, Saratoga; Mark Hamburg, Scotts Valley, both of CA (US)

(73) Assignee: Adobe Systems Incorporated, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 14 days.

(21) Appl. No.: 08/996,126

(22) Filed: Dec. 22, 1997

(51) Int. Cl.[7] .......................... G06T 11/40; G06T 11/00; G06T 11/60
(52) U.S. Cl. .......................... 345/431; 345/433; 345/435
(58) Field of Search .......................... 345/150, 153, 345/431, 433, 435; 382/167

(56) References Cited

U.S. PATENT DOCUMENTS

| 5,347,622 | * | 9/1994 | Takemoto et al. | 345/435 |
| 5,448,307 | * | 9/1995 | Gelissen et al. | 348/584 |
| 5,459,823 | * | 10/1995 | Silverbrook et al. | 345/431 |
| 5,469,536 | * | 11/1995 | Blank | 345/431 |
| 5,745,121 | * | 4/1998 | Politis | 345/433 |
| 6,038,031 | * | 3/2000 | Murphy | 345/431 |

* cited by examiner

Primary Examiner—Mark R. Powell
Assistant Examiner—Chante' Harrison
(74) Attorney, Agent, or Firm—Fish & Richardson P.C.

(57) ABSTRACT

Alpha-multiplied color data is converted into a form suitable for use in blending operations which does not generate a loss of color value precision or introduce significant color shifts into a blended object generated using the converted color data.

24 Claims, 4 Drawing Sheets

BLEND FUNCTIONS

| FUNCTION | RGB COLOR SPACE (W = 1, K = 0) | CMYK COLOR SPACE (W = 0, K = 1) |
|---|---|---|
| NORMAL | $C = B + \alpha(M' - B) + (F' - M')$ | $C = B + \alpha(M' - B) + (F' - M')$ |
| SHADOW | $C = B + \alpha B(M' - 1) + B(F' - M')$ | $C = B + \alpha M'(1 - B) + (1 - B)(F' - M')$ |
| GLOW | $C = B + \alpha M'(1 - B) + (1 - B)(F' - M')$ | $C = B + \alpha B(M' - 1) + B(F' - M')$ |
| DARKER | $C = B + \text{MIN}(\alpha(M' - B) + (F' - M'), 0)$ | $C = B + \text{MAX}(\alpha(M' - B) + (F' - M'), 0)$ |
| LIGHTER | $C = B + \text{MAX}(\alpha(M' - B) + (F' - M'), 0)$ | $C = B + \text{MIN}(\alpha(M' - B) + (F' - M'), 0)$ |
| ADD | $C = B + \alpha M' + (F' - M')$ | $C = B + \alpha(M' - 1) + (F' - M')$ |
| OVERPRINT | $C = B + \alpha(M' - 1) + (F' - M')$ | $C = B + \alpha M' + (F' - M')$ |

FIG. 3

| FUNCTION | BLEND FUNCTIONS |
|---|---|
| NORMAL | $C = B + \alpha(M' - B) + (F' - M')$ |
| SHADOW | $C = B + \alpha(B - K)(M' - W)/(W - K) + (B - K)(F' - M')/(W - K)$ |
| GLOW | $C = B + \alpha(B - W)(M' - K)/(K - W) + (B - W)(F' - M')/(K - W)$ |
| DARKER | $C = B + \text{DARKER}(\alpha(M' - B) + (F' - M'), 0)$ |
| LIGHTER | $C = B + \text{LIGHTER}(\alpha(M' - B) + (F' - M'), 0)$ |
| ADD | $C = B + \alpha(M' - K) + (F' - M')$ |
| OVERPRINT | $C = B + \alpha(M' - W) + (F' - M')$ |

FIG. 4

BLEND FUNCTIONS

| FUNCTION | RGB COLOR SPACE (W = 1, K = 0) | CMYK COLOR SPACE (W = 0, K = 1) |
|---|---|---|
| NORMAL | $C = B + \alpha(M' - B) + (F' - M')$ | $C = B + \alpha(M' - B) + (F' - M')$ |
| SHADOW | $C = B + \alpha B(M' - 1) + B(F' - M')$ | $C = B + \alpha M'(1 - B) + (1 - B)(F' - M')$ |
| GLOW | $C = B + \alpha M'(1 - B) + (1 - B)(F' - M')$ | $C = B + \alpha B(M' - 1) + B(F' - M')$ |
| DARKER | $C = B + \mathrm{MIN}(\alpha(M' - B) + (F' - M'), 0)$ | $C = B + \mathrm{MAX}(\alpha(M' - B) + (F' - M'), 0)$ |
| LIGHTER | $C = B + \mathrm{MAX}(\alpha(M' - B) + (F' - M'), 0)$ | $C = B + \mathrm{MIN}(\alpha(M' - B) + (F' - M'), 0)$ |
| ADD | $C = B + \alpha M' + (F' - M')$ | $C = B + \alpha M' + (F' - M')$ |
| OVERPRINT | $C = B + \alpha(M' - 1) + (F' - M')$ | $C = B + \alpha(M' - 1) + (F' - M')$ |

CONVERSION OF ALPHA-MULTIPLIED COLOR DATA

BACKGROUND

The present invention relates generally to processing and displaying digital documents and, more particularly, to the conversion of alpha-multiplied color data in a graphical processing system.

In graphical processing, an image can be represented as a rectangular array of sample values. Each sample value represents a color and may include a number of elements referred to as colorants. For example, an image sample in RGB color space includes three colorant values: one for each red, green, and blue. Likewise, an image sample in CMYK color space may include four colorant values: one for each cyan, magenta, yellow, and key (black). An image may approximate the appearance of some natural scene (e.g., a digitized photograph) or may be synthetically generated through any convenient graphics program such as PHOTOSHOP by Adobe Systems Incorporated of San Jose, Calif.

The transparency of a graphical object indicates the extent to which an underlying object may be seen through it. In graphical processing, an object's transparency is implemented through a technique known as blending. Blending generally involves combining a foreground color, associated with a foreground graphical object, and a background color, associated with a background graphical object, to create a third color. Blending can give an object the appearance of being translucent.

Another way to describe an object's transparency is to specify its opacity. Opacity refers to the degree of an object's opaqueness and is also known as "alpha" ($\alpha$). An opaque object always obscures any object already printed (or rendered) at the same location, and thus always appears in front of (overlies) previously printed (rendered) objects.

SUMMARY

Generally, the invention provides apparatus and methods to convert alpha-multiplied color data values. The conversion can substantially eliminate undesired color shifts by reducing the loss of color value precision during blending operations.

BRIEF DESCRIPTION OF THE DRAWINGS

FIG. 3 shows some substitute blend functions for processing images having pre-blended color values.

FIG. 4 illustrates substitute blend functions for the RGB and CMYK color spaces.

DETAILED DESCRIPTION

The following contemporaneously filed and commonly owned patent applications are incorporated by reference: "Dehalftoning of Digital Images" by Stephen Carlsen et al., Serial No. 08/995437filed Dec. 22, 1997"Blending Graphics Objects In A Frame Buffer" by Stephen Carlsen, Serial No. 08/996993 filed Dec. 22, 1997;"Blending Image Data Using Layers" by Stephen Carlsen et al., Serial No. 08/996592filed Dec. 22, 1997 "Transparency Processing in a Page Description Language" by Lars Borg et al., and Serial No. 08/996126filed Dec. 22, 1997 "Blending with Planar Maps" by Stephen N. Schiller et al. Serial No. 08/999381filed Dec. 22, 1997.

Figure 1:
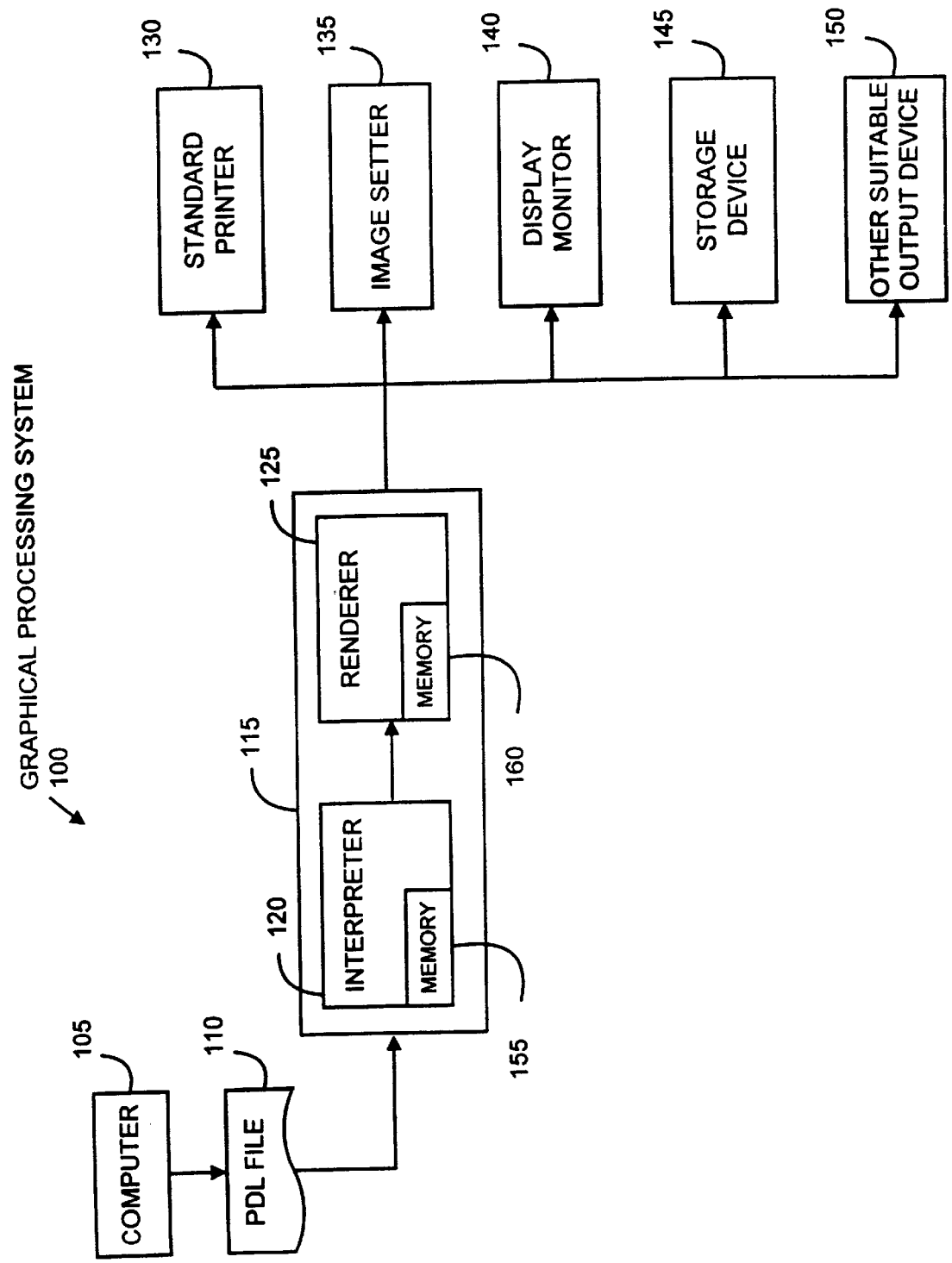
FIG. 1 shows a schematic block diagram of a graphical processing system.

Referring to FIG. 1, an illustrative graphical processing system 100 includes a computer system 105 and a raster image processor (RIP) device 115. The computer system 105 may be of any type, including a general purpose computer or a dedicated graphics workstation, and usually transmits information to the RIP 115 in the form of a file 110 whose graphical contents are represented in a page description language (PDL). Well known PDLs include the POSTSCRIPT language and the PORTABLE DOCUMENT FORMAT (PDF) language. Both POSTSCRIPT and PORTABLE DOCUMENT FORMAT are trademarks of Adobe Systems Incorporated, San Jose, Calif. The interpreter 120 executes the PDL file's 110 instructions and conveys the interpreted data to a renderer 125. The renderer 125 generates a raster based representation (e.g., a bit stream) of its input. Renderer output may be sent to a standard (e.g., color or grayscale) printer 130, an image setter 135, a display monitor 140, a storage device 145, or any other suitable output device 150. Common storage devices 145 include, but are not limited to, magnetic disks (fixed, floppy, and removable), other magnetic material such as tape, optical medica such as CD-ROM disks, and electro-optical devices. The interpreter 120 and renderer 125 may include memory (155 and 160 respectively) which may be read only memory or random access memory or a combination thereof.

Figure 2:
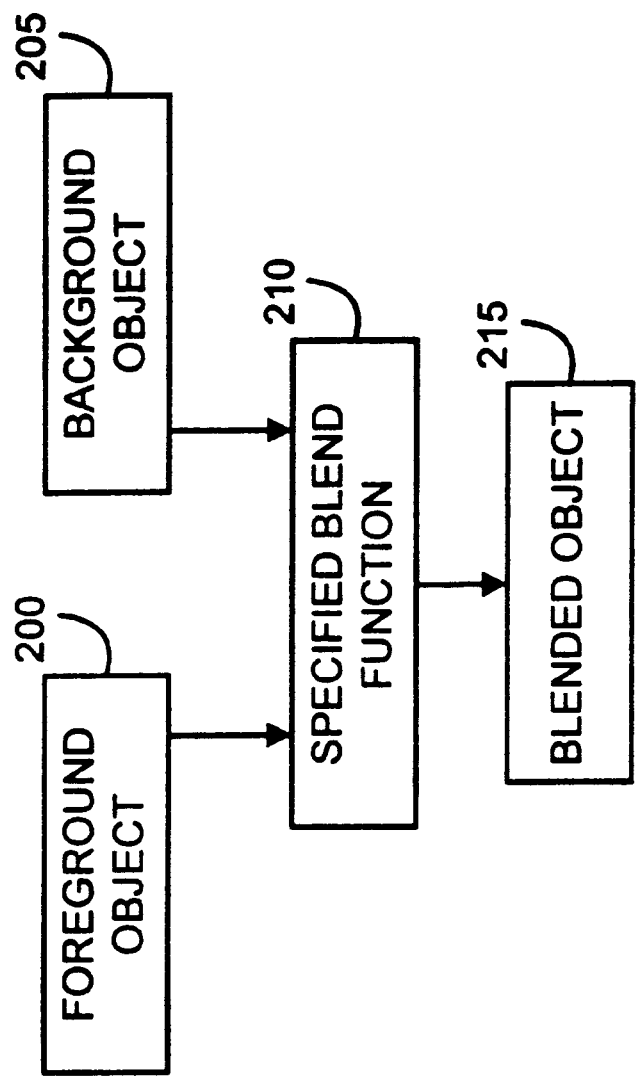
FIG. 2 illustrates blending foreground and background graphical objects.

Referring to FIG. 2, in general, blending takes a foreground object 200 having associated blend information, and a background object 205 and combines them in accordance with a specified blend function 210 to generate a blended object 215. The foreground object 200 could, for example, be represented in raster format (i.e., an image) or in a vector format. Similarly, the background object 205 could be an image or a vector object. The blended object 215 can be considered as a final object (e.g., image), or treated as the foreground or background object in a subsequent blending operation.

A graphical object whose sample values have been previously multiplied by the image's opacity ($\alpha$) value is referred to as an alpha-multiplied object. While any graphical object may have alpha-multiplied color values, the remainder of this description will focus on the case where the graphical object is an image.

In an alpha-multiplied image, each colorant value in each sample has a color value (Fm) given by:

$$Fm = M + \alpha(F-M),$$

where F is the image's original color (e.g., foreground) value, M is the image's matte color (specified to be that color the image fades to when $\alpha$ goes to zero, i.e., when the image is fully transparent), and $\alpha$ is the image's opacity or alpha value.

Alpha-multiplied images can be easily blended if the color space of the foreground (the image) and background are the same. If the foreground and background color spaces are different, many blend operations cannot be performed without introducing significant undesired color shifts in the resulting blended image.

Alpha-multiplied data values (Fm) cannot, in general, be used to generate the image's original color values (which could then be used in the blend operation) via the inverse function $$F = M + ((Fm-M)/\alpha),$$

because $\alpha$ can be zero (representing an opaque object). Even where $\alpha$ is not zero, repeated multiplications (performed to generate alpha-multiplied data values, Fm) and divisions (by α to compute the image's original colorant values, F) can result in a loss of precision in the resulting sample/color value. This result follows from the properties of multiplication and division operations as applied (repeatably) to fixed precision values; each colorant is generally represented as an 8-bit, 16-bit, or 24-bit quantity. This loss of precision can manifest itself in undesirable color shifts in the resulting blended image.

By effectively changing the image's matte color to a new color (M'), undesirable color shifts introduced when blending an alpha-multiplied image, having color values in a first color space, with a background image, having color values in a different color space, can be substantially eliminated.

An alpha-multiplied image's matte color (M) can be effectively changed to a new matte color (M') by adjusting each colorant value in each sample in accordance with the following equation:

$$F'=Fm+(1-\alpha)(M'-M),$$

where F' represents the converted color value (which approximates the image's original, prealpha-multiplied value). In the RGB and CMYK color spaces, an especially useful substitute matte color (M') is the white color (W), i.e., the lightest color value in the color space.

Once an image's alpha-multiplied color data have been converted in this manner, the image (e.g., foreground) and background can be blended in accordance with a specified blend function. Illustrative blend functions are shown in FIG. 3. FIG. 4 illustrates specific blending functions for the RGB and CMYK color spaces. In FIGS. 3 and 4: C represents the converted color value; W the lightest color value in the color space (e.g., the white color value); K the darkest color value in the color space (e.g., the black color value); the LIGHTER( ) function returns the maximum of its input arguments if K is less than W, and the minimum of its input arguments if K is greater than or equal to W; the DARKER( ) function returns the minimum of its input arguments if K is less than W, and the maximum of its input arguments if K is greater than or equal to W; the MIN( ) function returns the minimum value of its input arguments; B represents a color value of a second image corresponding to the converted color value F'; the MAX( ) function returns the maximum value of its input arguments; and B, M', Fm, and α are as defined above and M', $F_M$ are as defined above.

The normal blend mode (300 [C=Bα(M'-B)+(F'-M')] and 400) is a weighted average of the foreground and background colors. The shadow blend mode (305 [C=B+α(B-K)(M'-W)/(W-K)+(B-K)(F'-M')/(W-K)] and 405) simulates a shadow by scaling the background color towards dark proportional to the darkness and color of the foreground color. The glow blend mode (310 [C=B+α(B-W)(M'-K)/(W-K)+(B-W)(F'-M')/(K-W)] and 410) simulates a glow by scaling the background color towards light proportional to the lightness and color of the foreground color. The darker blend mode (315 [C=B+DARKER(α(M'-B)+(F'-M'), 0)] and 415) selects the darker of the foreground and background colors. The lighter blend mode (320 [C=B+LIGHTER(α(M'-B)+(F'-M'), 0)] and 420) selects the lighter of the foreground and background colors. The add blend mode (325 [C=B+α(M'-K)+(F'-M')] and 425) simulates two combined light sources by adding color intensities. The overprint blend mode (330 [C=B+α(M'-W)+(F'-M')] and 430) simulates overprinting of two inks by adding ink color values.

The invention may be implemented in digital electronic circuitry or in computer hardware, firmware, software, or in combination of them. For example, the invention may be implemented, at least in part, as a computer program tangibly embodied in a machine-readable storage device for execution by a computer processor. Method steps according to the invention may be performed by a computer processor executing instructions organized, e.g., into program modules to operate on input data and to generate output. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Any of the foregoing may be supplemented by, or incorporated in, specially-designed application-specific integrated circuits (ASICS). Other embodiments than those described above are within the scope of the following claims.

The present invention has been described in terms of a specific embodiment, which is illustrative of the invention and is not to be construed as limiting. Other embodiments than those described above are within the scope of the following claims.

What is claimed is:

1. A method of converting color values in a graphical processing system, comprising:

obtaining a color value ($F_M$) that represents a color in a color space, the color value ($F_M$) being an alpha-multiplied color value of an original color value (F);

obtaining an opacity value (α) that represents the opacity of the original color value (F);

obtaining a matte color value (M); and generating a converted color value (F'), the converted color value (F') being an approximation of the original color (F), the converted color value (F') generated according to the following equation:

$$F'=F_M+(1-\alpha)(M'-M)$$

where M' is a constant value that represents a substitute matte color.

2. The method of claim 1 further comprising blending the converted color value (F') with a second color value in accordance with a blending function.

3. The method of claim 2 wherein the substitute matte color is white.

4. The method of claim 1 wherein the color space is the RGB color space.

5. The method of claim 1 wherein the color space is the CMYK color space.

6. The method of claim 2 wherein the color value ($F_M$) is associated with an image.

7. The method of claim 6 wherein the image includes a plurality of samples, each sample having a plurality of color elements, the color value ($F_M$) representing a color of a color element.

8. The method of claim 7 further comprising generating a blend color value C in accordance with the following equation:

$$C=B+\alpha(M'-B)+(F'-M'),$$

where B represents a color value of a second image corresponding to the converted color value F'.

9. The method of claim 7 further comprising generating a blend color value C in accordance with the following equation:

$$C=B+\alpha(B-K)(M'-W)/(W-K)+(B-K)(F'-M')/(W-K),$$

where B represents a color value of a second image corresponding to the converted color value F', W is a constant value that represent the lightest color representable in the color space, and K is a constant value that represents the darkest color representable in the color space.

10. The method of claim 7 further comprising generating a blend color value $\underline{C}$ in accordance with the following equation:

$$\underline{C}=B+\alpha(B-W)(M'-K)(W-K)+(B-W)(F'-M')/(K-W),$$

where B represents a color value of a second image corresponding to the converted color value F', W is a constant value that represent the lightest color representable in the color space, and K is a constant value that represents the darkest color representable in the color space.

11. The method of claim 7 further comprising generating a blend color value $\underline{C}$ in accordance with the following equation:

$$\underline{C}=B+\text{DARKER}(\alpha(M'-B)+(F'-M'),0),$$

where B represents a color value of a second image corresponding to the converted color value F', W is a constant value that represents the lightest color representable in the color space, K is a constant value that represents the darkest color representable in the color space, and the function DARKER( ) returns the minimum value of its input if K is less than W and the maximum value of its input if K is greater than or equal to W.

12. The method of claim 7 further comprising generating a blend color value $\underline{C}$ in accordance with the following equation:

$$\underline{C}=B+\text{LIGHTER}(\alpha(M'-B)+(F-M'),0),$$

where B represents a color value of a second image corresponding to the converted color value F', W is a constant value that represents the lightest color representable in the color space, K is a constant value that represents the darkest color representable in the color space, and the function LIGHTER( ) returns the maximum value of its input if K is less than W and the minimum value of its input if K is greater than or equal to W.

13. The method of claim 7 further comprising generating a blend color value $\underline{C}$ in accordance with the following equation:

$$\underline{C}=B+\alpha(M'-K)+(F'-M'),$$

where B represents a color value of a second image corresponding to the converted color value F', and K is a constant value that represents the darkest color representable in the color space.

14. The method of claim 7 further comprising generating a blend color value (X) in accordance with the following equation:

$$\underline{CC}=B+\alpha(M'-W)+(F'-M'),$$

where B represents a color value of a second image corresponding to the converted color value F', and W is a constant value that represent the lightest color representable in the color space.

15. A program storage device readable by a computer system and having encoded therein a program of instructions that includes instructions to:

obtaining a color value ($F_M$) that represents a color in a color space, the color value ($F_M$) being an alpha-multiplied color value of an original color value (F);

obtaining an opacity value ($\alpha$) that represents the opacity of the original color value (F);

obtaining a matte color value (M); and generating a converted color value (F'), the converted color value (F') being an approximation of the original color (F), the converted color value (F') generated according to the following equation:

$$F'=F+(1-\alpha)(M'-M)$$

where M' is a constant value that represents a substitute matte color.

16. The program storage device of claim 15 further comprising instructions to blend the converted color value (F') with a second color value in accordance with a blending function.

17. The program storage device of claim 16 wherein the substitute matte color is white.

18. The program storage device of claim 15 wherein the color space is the RGB color space.

19. The program storage device of claim 15 wherein the color space is the CMYK color space.

20. The program storage device of claim 15 wherein the color value ($F_M$) is associated with an image.

21. The program storage device of claim 20 wherein the image includes a plurality of samples, each sample having a plurality of color elements, the color value representing a color of a color element.

22. The program storage device of 21 further including instruction to convert each color element in each sample of the image.

23. The method of claim 2 wherein the original color (F) is associated with a first color space, the second color value is associated with a second color space and the first and second color spaces are different.

24. The program storage device of claim 16 wherein the original color (F) is associated with a first color space, the second color value is associated with a second color space and the first and second color spaces are different.

* * * * *

UNITED STATES PATENT AND TRADEMARK OFFICE
CERTIFICATE OF CORRECTION

PATENT NO.    : 6,208,351 B1
DATED         : March 27, 2001
INVENTOR(S)   : Mark Hamburg and Lars U. Borg It is certified that error appears in the above-identified patent and that said Letters Patent is hereby corrected as shown below:

Column 3,
Line 45, please delete "B$\alpha$" and insert -- B+$\alpha$ -- therefor.
Line 48, please delete "$\underline{C}$=B+$\alpha$(B-K)(M'-W)/(W-K)+(B-K)(F'-M')/(W-K)]" and insert -- C=B+$\alpha$(B-K)(M'-W)/(W-K)+(B-K)(F'-M')/(W-K)] -- therefor.
Line 52, please delete "$\underline{C}$=B+$\alpha$(B-W)(M'-K)/(W-K)+(B-W)(F'-M')/(K-W)]" and insert -- C=B+$\alpha$(B-W)(M'-K)/(W-K)+(B-W)(F'-M')/(K-W)] -- therefor.
Line 56, please delete "$\underline{C}$=B+DARKER($\alpha$(M'-B)+(F'-M'), 0)]" and insert -- C=B+DARKER($\alpha$(M'-B)+(F'-M'), 0)] -- therefor.
Line 58, please delete "$\underline{C}$=B+LIGHTER($\alpha$(M'-B)+(F'-M'), 0)]" and insert -- C=B+LIGHTER($\alpha$(M'-B)+(F'-M'), 0)] -- therefor.
Line 61, please delete "$\underline{C}$=B+$\alpha$(M'-K)+(F'-M')]" and insert -- C=B+$\alpha$(M'-K)+(F'-M')] -- therefor.
Line 63, please delete "$\underline{C}$=B+$\alpha$(M'-W)+(F'-M')]" and insert -- C=B+$\alpha$(M'-W)+(F'-M')] -- therefor.

Column 4,
Line 57, please delete "$\underline{C}$" and insert -- C -- therefor.
Line 60, please delete "$\underline{C}$=B+$\alpha$(M'-B)+(F'-M')," and insert -- *C=B+$\alpha$(M'-B)+(F'-M'),* -- therefor.
Line 64, please delete "$\underline{C}$" and insert -- C -- therefor.,
Line 67, please delete "$\underline{C}$=B+$\alpha$(B-K)(M'-W)/(W-K)+(B-K)(F'-M')/(W-K)," and insert -- *C=B+$\alpha$(B-K)(M'-W)/(W-K)+(B-K)(F'-M')/(W-K),* -- therefor.

Column 5,
Line 7, please delete "$\underline{C}$" and insert -- C -- therefor.
Line 10, please delete "$\underline{C}$=B+$\alpha$(B-W)(M'-K)(W-K)+(B-W)(F'-M')/(K-W)," and insert -- *C=B+$\alpha$(B-W)(M'-K)(W-K)+(B-W)(F'-M')/(K-W),* -- therefor.
Line, 18, please delete "$\underline{C}$" and insert -- C -- therefor.
Line 21, please delete "$\underline{C}$=B+DARKER($\alpha$(M'-B)+(F'-M'),0)," and insert -- *C=B+DARKER($\alpha$(M'-B)+(F'-M'),0),* -- therefor.
Line 31, please delete "$\underline{C}$" and insert -- C -- therefor.
Line 34, please delete "$\underline{C}$=B+LIGHTER($\alpha$(M'-B)+(F-M'),0)," and insert -- *C=B +LIGHTER($\alpha$(M'-B)+(F'-M'),0),* -- therefor.
Line 45, please delete "$\underline{C}$" and insert -- C -- therefor.
Line 48, please delete "$\underline{C}$=B+$\alpha$(M'-K)+(F'-M')," and insert -- *C=B+$\alpha$(M'-K)+(F'-M'),* -- therefor.

UNITED STATES PATENT AND TRADEMARK OFFICE
CERTIFICATE OF CORRECTION

PATENT NO.    : 6,208,351 B1
DATED         : March 27, 2001
INVENTOR(S)   : Mark Hamburg and Lars U. Borg It is certified that error appears in the above-identified patent and that said Letters Patent is hereby corrected as shown below:

<u>Column 6,</u>
Line 1, please delete "$\underline{C}C=B+\alpha(M'-W)+(F'-M')$," and insert -- $C=B+\alpha(M'-W)+(F'-M')$ -- therefor.

Signed and Sealed this

Twenty-sixth Day of November, 2002

Attest:

JAMES E. ROGAN
Attesting Officer *Director of the United States Patent and Trademark Office*